F. M. HENRY.
MACHINE FOR MOLDING CONCRETE BLOCKS.
APPLICATION FILED JUNE 10, 1907.
930,665.
Patented Aug. 10, 1909.
2 SHEETS—SHEET 1.
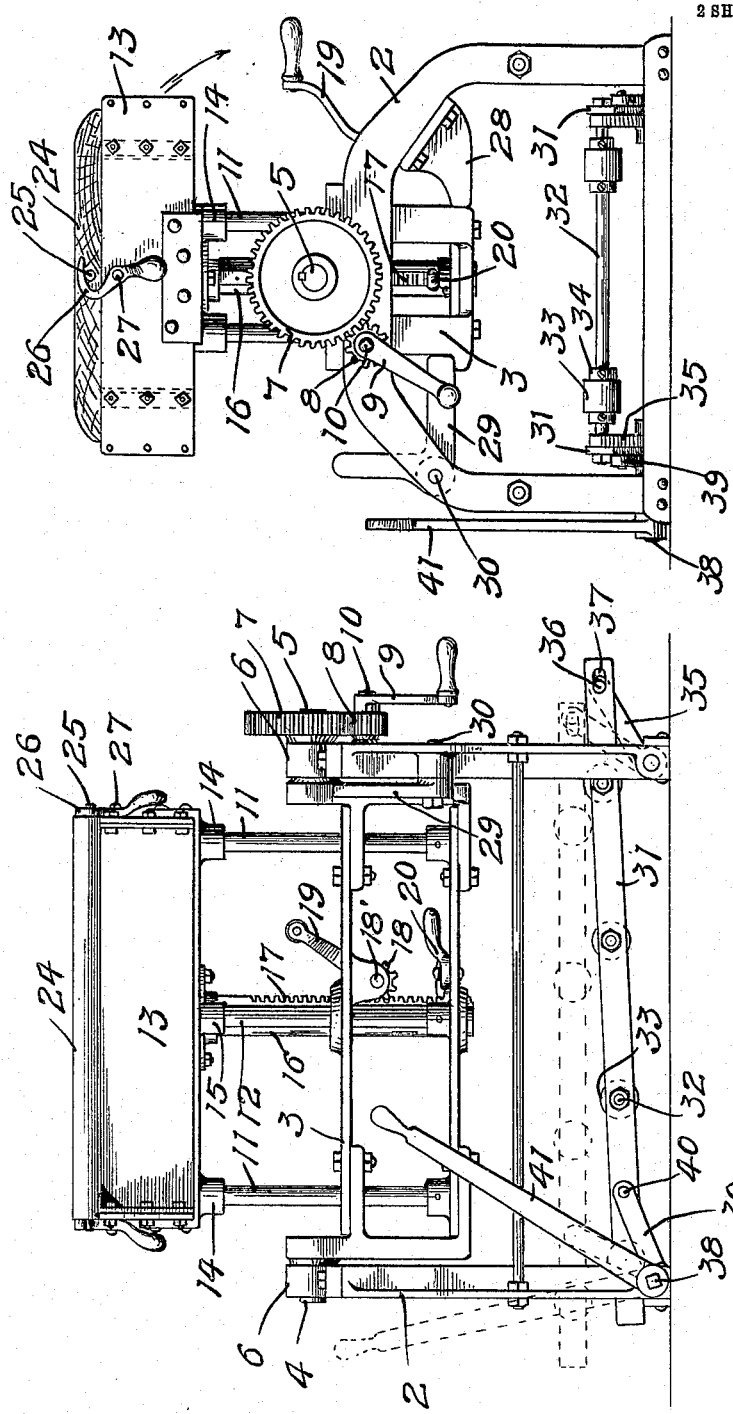
WITNESSES
INVENTOR
FRANCIS M. HENRY
BY
HIS ATTORNEYS F. M. HENRY.
MACHINE FOR MOLDING CONCRETE BLOCKS.
APPLICATION FILED JUNE 10, 1907.

930,665.

Patented Aug. 10, 1909.
2 SHEETS—SHEET 2.

WITNESSES

INVENTOR
FRANCIS M. HENRY
BY
HIS ATTORNEYS

FRANCIS M. HENRY, OF MINNEAPOLIS, MINNESOTA.

MACHINE FOR MOLDING CONCRETE BLOCKS.

No. 930,665.      Specification of Letters Patent.      Patented Aug. 10, 1909.

Application filed June 10, 1907. Serial No. 378,118.

*To all whom it may concern:*

Be it known that I, FRANCIS M. HENRY, of Minneapolis, Hennepin county, Minnesota, have invented certain new and useful Improvements in Machines for Molding Concrete Blocks, of which the following is a specification.

The object of my invention is to provide a machine wherein concrete blocks or bricks can be easily and quickly molded.

A further object is to provide a machine particularly adapted for molding a T-shaped block such as is shown and described in a certain pending application for Letters Patent of the United States filed by me on the 19th day of January, 1907, Serial No. 353,074.

The invention consists generally in various constructions and combinations, all as hereinafter described and particularly pointed out in the claims.

Figure 3:
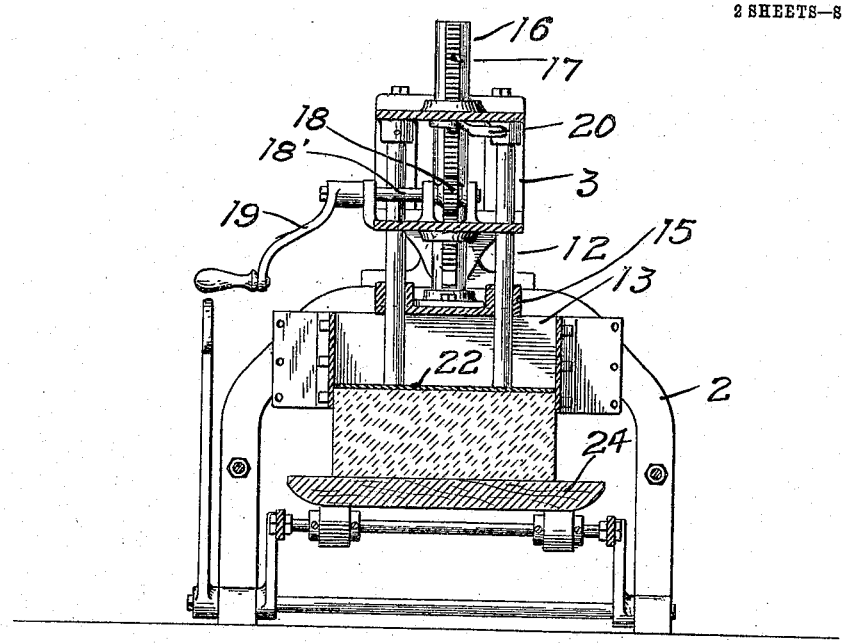
Figure 4:
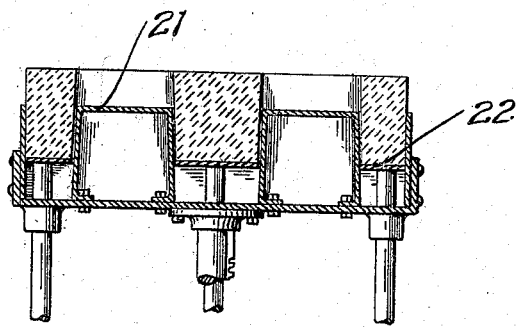

In the accompanying drawings, forming part of this specification, Figure 1 is a side elevation of a block machine embodying my invention. Fig. 2 is an end view of the same. Fig. 3 is a vertical sectional view showing the mold inverted in position to discharge the completed block. Fig. 4 is a sectional view of the mold illustrating the shape of the block and the manner of discharging it from the mold.

In the drawing, 2 represents a frame wherein the operating parts of the machine are mounted.

3 is a mold frame having gudgeons 4 and 5 that are mounted in bearings 6 on the top of the frame 2. The gudgeon 5 extends beyond the end of the frame 2 and is provided with a large gear wheel 7 that meshes with a small pinion 8 on a crank 9 that is supported on a stud 10 at the end of the machine frame. When the crank is operated the gear 7 will be revolved and with it the frame 3.

Mounted in the frame 3 are a series of upright rods 11 arranged in pairs at the ends of the frame and similar rods 12 are located midway of said frame and extend up parallel with the rods 11. A mold 13 has sockets 14 and 15 corresponding in number to the said rods 11 and 12 and in which sockets the upper ends of said rods are slidable. A bar 16 depends from the under side of the mold and has a series of teeth 17 that are engaged by a pinion 18 on a shaft 18' that is provided with a crank 19 by means of which the mold can be raised or lowered on the said rods. An eccentric lever 20 is adapted to engage the teeth at the bottom of the rack bar and lock the mold at any desired elevation. Cores 21 are provided in the mold and plates 22 and 23 are located in the bottom of the mold upon the ends of the rods 11 and 12 and may be secured thereto, or detachable as preferred. A pallet 24 is provided for the top of the mold having pins 25 that are engaged by hooks 26 pivoted at 27 on the walls of the mold. When the block has been formed in the mold the pallet is placed thereon and locked by means of the hooks and then by revolving the frame 3 the mold will be swung to an inverted position. Normally the lower portion of the frame 3 will bear against a stop 28 and be held in engagement therewith by a dog 29 that is pivoted at 30 on the machine frame. As long as the dog is in the position shown in Fig. 2 the mold will be held in its raised position and there will be no danger of its becoming accidentally inverted before the block is formed. When the mold is filled and the pallet placed thereon and secured the operator may trip the dog 29 and allow the mold to swing to the position indicated in Fig. 3. Any suitable mechanism may be employed to aid the operator in removing the block from the mold, but I prefer to provide the device which I will now describe in detail.

31 represents parallel bars arranged beneath the mold frame and connected by transverse rods 32 whereon antifriction rollers 33 are mounted and held in place by collars 34. These collars are adjustable back and forth on the rods to permit the rollers to be moved toward or from one another according to the size of the block that is being molded. Arms 35 are mounted at one end on the machine frame and have pins 36 at their opposite ends adapted to enter slots 37 in the bars 31. A shaft 38 is provided at the opposite end of the frame whereon crank arms 39 are secured and pivotally connected at 40 with the bars 31. A lever 41 is mounted on the shaft 38 by means of which the said shaft may be rotated and the bars moved from the position indicated by full lines in Fig. 1 to the dotted line position shown in Fig. 1. When the bars are in their down position the mold can be easily swung to its inverted position without obstruction and when the mold has been inverted the operator will raise the bars 31 until the rollers contact with the pallet and then the dogs 26 will be disengaged to allow the pallet to rest by gravity upon the rollers 32 and support the block. As soon as the pallet has been released the operator by means of the crank 19 and the rack and pinion mechanism connected therewith can raise the mold and lift it off the block. The walls of the mold will have a sliding action on the block and will not, therefore, stick or cause any breakage of the concrete mixture and as soon as the mold has been raised sufficiently to clear the top of the block the operator may lower the bars 31 sufficiently to cause the pallet to move by gravity over the rollers to a point where it can be conveniently removed from the machine.

A gravity carrier may be provided in connection with the rails 31 and their rollers to permit the blocks to be transported to a distant point and stacked up to dry.

Blocks of any size and shape can be molded in this machine and as fast as a block is formed and discharged the mold may be returned to its upright position and the operation of filling and inverting repeated.

I have illustrated my machine as designed particularly for manufacturing one block at a time, but it will be understood that the size of the machine may be varied and a series of blocks molded therein simultaneously, it being merely necessary to provide suitable partitions on the bottom plate separating the contiguous blocks. In other respects the construction of the machine will remain substantially the same.

I claim as my invention:

1. The combination, with a frame, of a mold box revolubly mounted therein, means for swinging the said box to an inverted position, a plate on which the block is molded, means for supporting the block that is being molded when the box is inverted, means for raising said box to separate it from the block and said plate, and means for holding said plate stationary during the raising operation.

2. The combination, with a frame, of a mold box having side and end walls and a bottom and revolubly mounted in said frame, means for swinging the said frame and box to an inverted position, a plate on which the block is molded, means for supporting the block when the box is inverted, means for raising said box to separate it from the block and said plate, and means extending through the bottom of said box and on which said box is slidable for holding said plate stationary during the raising operation.

3. The combination, with a frame, of a mold box revolubly mounted therein and comprising side and end walls, and a bottom and cores secured on said bottom, means for swinging the said box to an inverted position, a plate fitting within said box and on which the block is molded, said plate having openings to receive said cores, means for supporting the block when the box is inverted, means for raising said box, and cores to separate them from the block and said plate, and means for holding said plate stationary during the raising operation.

4. The combination, with a frame, of a mold box revolubly mounted therein, means for swinging the said box to an inverted position, a plate provided in the bottom of said box and on which the block is molded, a pallet fitting on the top of said box, and means for securing it thereon, means arranged to engage the pallet and support the same when the box and block are inverted, means for raising said box to separate it from the block and said plate, and means for holding said plate stationary during the operation of separating the block and box.

5. The combination, with a frame, of a mold box revolubly mounted therein, means for swinging the said box to an inverted position, a pallet and means for securing the same on the top of said box, means provided below said frame and box and normally out of the path of the same, but adapted to be raised into contact with said pallet to support it and said block, means for raising the bottom and side walls of said box to separate them from the block, said walls sliding on the faces of the block during the upward movement.

6. The combination, with a revoluble frame, and means for operating the same, of a mold box mounted in said frame, a pallet fitting on the top of said box, and means for securing it thereon, means for raising said box to separate it from the block when said frame is inverted, a rack provided beneath said frame, oscillating arms whereon said rack is supported, said rack normally occupying an inclined depressed position out of the path of said frame, and means for raising said arms to lift said rack to a horizontal position and in contact with said pallet, substantially as described.

7. The combination, with a swinging frame, and means for operating the same, of a mold box, rods mounted on said frame and sliding in sockets provided in the bottom of said box, a plate fitting within said box and contacting with the ends of said rods, and on which the block is molded, a pallet fitting on the top of said box, and means for locking it thereon, and means for raising said box on said rods to separate it from the molded block when said box and frame are inverted, substantially as described.

8. The combination, with a frame, of a mold box revolubly mounted therein and comprising side and end walls and a bottom, means for swinging said mold box to an inverted position, a plate provided within said box and on which the block or brick is molded, cores provided on the bottom of said box and projecting through openings in said plate, means for raising the side and end walls and bottom of said box and said cores when said mold box is swung to an inverted position, and means for holding said plate stationary during the raising operation, whereby a separation will be effected between the block and said box.

9. The combination, with a revoluble frame, of rods mounted thereon, plates supported on said rods and forming the bottom of a mold box, walls inclosing said plates and having a vertical sliding movement on said rods when said box is inverted, a pallet adapted to cover the top of the mold box formed by said plate and said walls, means for locking the pallet on the mold box, and means for sliding said walls vertically on the faces of the block to separate them from the said pallet and the bottom plate when the box is swung to an inverted position, substantially as described.

10. The combination, with the upright standards, of a frame pivotally supported between them, the pivots of said frame being above the middle portion thereof, rods mounted in said frame, and normally in a vertical position, a mold box slidably supported on said rods, a rack and pinion mechanism for raising and lowering said box on said rods, a pallet for closing the top of said box, means for revolving said frame to swing said box to an inverted position, and means for separating the side walls and bottom of said box from the mold block when said rack and pinion mechanism is operated to raise said box on said rods after it has been inverted.

11. The combination, with the upright standards, of a frame pivoted at its ends therein, and means for revolving said frame, rods mounted in said frame and normally in a vertical position therein, a mold box comprising side and end walls and a bottom plate and cores on said bottom plate slidably supported on said rods and means for raising and lowering said box on said rods, a pallet arranged to close the top of said box and on which the mold block is supported when the box is inverted, means for preventing the premature tilting of said box, and said box when inverted assuming by gravity a horizontal position, and means for holding said block down upon said pallet when said box is raised after being inverted, substantially as described.

12. The combination, with a frame, of a mold box revolubly mounted therein, means for swinging said box to an inverted position, a plate on which the block is molded, means for supporting the block that is being molded when the box is inverted, and means for raising said box to separate it from the block and said plate.

In witness whereof, I have hereunto set my hand this 31st day of May 1907.

FRANCIS M. HENRY.

Witnesses:
J. B. ERA,
I. M. PYATT.